Patented Oct. 27, 1942

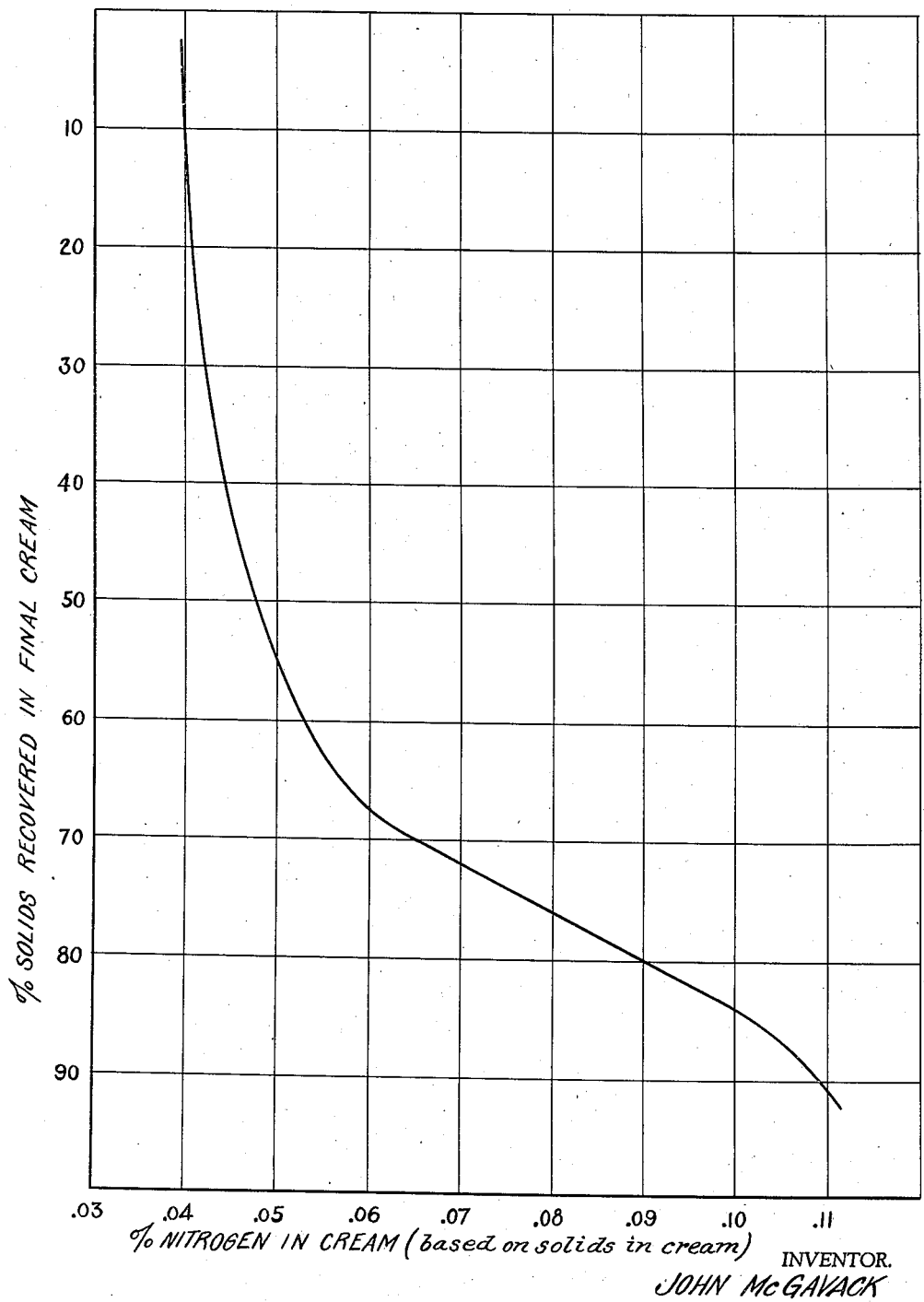

2,300,261

UNITED STATES PATENT OFFICE 2,300,261

PURIFIED RUBBER LATEX AND PROCESS OF PREPARING SAME

John McGavack, Leonia, N. J., assignor to United States Rubber Company, New York, N. Y., a corporation of New Jersey Original application February 16, 1939, Serial No. 256,672. Divided and this application August 2, 1940, Serial No. 350,103

4 Claims. (Cl. 260—822)

This invention relates to the purification of Hevea rubber latex and more particularly to the production by chemical creaming or mechanical centrifuging methods of a latex having a nitrogen content of not more than .050%.

This is a division of application Serial No. 256,672, filed February 16, 1939.

Multiple or repeated creaming of rubber latex with dilution of successive cream portions before recreaming is common practice both in chemical and mechanical creaming operations. The rubber particles in the latex may be washed in this way to any desired extent and the desired amount of naturally occurring water soluble constituents of the latex removed with successive separations of the serum portions from the cream. Purified and concentrated latices from which at least a large proportion of the naturally occurring non-nitrogenous water-soluble constituents have been removed are readily obtained in this manner. When the creaming operations have been produced by chemical creaming methods, as by the repeated dilution and addition of hydrophilic colloids and separation of cream and serum portions by gravity, a purified latex with a nitrogen content as low as .10%, based on the solids in the latex, has been obtained. In repeated mechanical creaming operations, in which the cream and serum portions are separated by centrifuging, a purified latex with a nitrogen content as low as .056% based on the solids in the latex has been obtained after nine creaming operations ("Purified Rubber for Electrical Insulation," by A. R. Kemp, Industrial & Engineering Chemistry, vol. 29, p. 643). The nitrogen remaining after such extensive washing of the rubber particles and the removal of substantially all the original serum of the latex, represents protein strongly adsorbed on the surfaces of the rubber particles, which protein cannot be removed merely by further washing. It is known that when creaming is made to take place in the presence of alkali-metal hydroxides, the alkali solubilizes the protein layer on the rubber particles and this solubilized protein may be removed by repeated creaming to produce a latex with a nitrogen content of less than .01%, based on the solids, but such methods of creaming with alkali-metal hydroxides are unsuitable for commercial purposes because of the difficulty of removing all the alkali from the final cream, the presence of alkali being undesirable for many purposes.

It is the object of the present invention to produce a rubber latex with a nitrogen content of not more than .050%, based on the solids in the latex, by creaming operations without utilizing the solubilizing effect on the proteins of alkali-metal hydroxides and without the inherent disadvantages of such alkali treatment. I have found that it is possible to produce a purified latex containing not more than .050% of nitrogen, based on the solids of the latex, by creaming operations if not more than 50% of the total solids of the original latex are recovered in the final cream and if the rubber particles in the cream have been washed a sufficient amount so that not more than 2% of the original serum of the latex remains in the final cream.

The accompanying drawing is a graph illustrating the relationship between the nitrogen content of the rubber particles themselves and the percent of the original rubber particles recovered in the final cream.

According to the present invention, rubber latex is creamed by chemical creaming or mechanical centrifuging operations, or both, in such a manner that at least 50% of the total solids of the original latex are separated in one or more serum portions, and not more than 2% of the original serum of the latex is recovered in the final cream. Where the desired creaming and washing operations are performed by multiple creaming, the separation of the 50% or more of the total solids of the original latex from the cream may to a large extent take place in any one of the creaming operations and the recovery of the solids in the remaining creaming operations may be relatively high, or the desired proportions of the 50% or more of the total solids of the original latex which are to be removed may be separated in different creaming operations, so long as the final cream contains not more than 50% of the total solids of the original latex. In order to reduce the number of creaming operations necessary to remove 98% or more of the original serum, the original latex or any of the separated creams may be diluted to any desired extent before creaming. In mechanical creaming processes, the washing of the rubber particles to the desired extent of removal of 98% or more of the original serum of the latex may take place continuously in a centrifuge, provided that at least 50% of the total solids of the original latex are removed in the centrifuging operation.

Chemical creaming and mechanical centrifuging processes are sufficiently well known at this time that it is only necessary to mention various methods of obtaining the desired separation of solids in the serums in the various creaming operations. In chemical creaming operations the amount of creaming agent necessary to give any desired separation of solids in the serum portion can readily be determined for each creaming agent. In the case of hydrophilic organic colloids, such as alginate, pectin, locust bean gum and other vegetable mucilages which are commonly employed as creaming agents, the amount of creaming agent necessary for separation of a desired percentage of the total solids of the latex from any one serum will depend on the specific creaming agent, its age, the way it is prepared, and various other factors, but it is only a matter of simple test to determine for any given creaming agent the correct amount for the desired separation of solids in the cream in any one creaming operation. If 48% or more of the total solids of the original latex are separated in any one creaming operation, the remaining creaming operations may be made to take place in the presence of sufficient creaming agent to give a maximum separation of solids in the cream. In mechanical creaming operations, the feed of the centrifuge bowl may be readily regulated so that any amount of solids in the latex may be separated out in any one or more of the centrifuging operations. The final cream may be utilized in the concentrated form as produced, or may be diluted with water to any desired rubber content.

As may be seen from the accompanying graph, the nitrogen content of the rubber particles themselves decreases with the decreasing recovery of solids of the original latex in the purified cream. The graph was prepared from data where there was substantially none of the original serum retained and hence where the original water-soluble serum substances were substantially completely removed in the final cream. It may be seen that the average nitrogen content actually associated with all the rubber particles in a given natural Hevea latex is about .1%. The total nitrogen content of a normal latex may average from .5% to .9%, based on the solids of the latex, and this represents the nitrogen actually associated with the rubber particles together with the nitrogen dissolved in the serum. It may thus be seen by reference to the chart that the greater the recovery of solids in a final cream produced according to the present invention, the greater must be the extent of washing. The recovery of solids according to the present invention may not be over 50%, otherwise even with substantially complete removal of the original serum from the final cream, the nitrogen content will be greater than .050%. With a decreasing recovery of solids in the final cream, the removal of the original serum from the final cream need not be so complete. Where, for example, 20% or less rubber is recovered in the final cream, and the original latex has a nitrogen content not greater than .5%, based on the rubber, then around 2% retention of the original serum in the final cream will give a nitrogen content of the final cream of about .050%, based on the rubber. In commercial creaming and centrifuging processes today, not more than 20% of the total solids of the original latex are lost in multiple creaming operations, and, as may be seen from the drawing, the nitrogen content of such creams even where all the original serum has been removed from the final purified cream product will be in excess of .085% based on the solids content of the cream. In commercial creaming operations today, the desideratum is naturally high yield of solids in the cream, but in the present invention the high yield must be sacrificed for the abnormally low nitrogen content obtained.

The latex of the present invention is also very different from latices where high efficiency is obtained in the creaming operation with consequent low separation of solids in the serum portion. In normal rubber latex the average particle diameter is .26 micron or less ("Ultraviolet Microscopy of Hevea Rubber Latex" by Francis F. Lucas, Industrial and Engineering Chemistry, vol. 30, pp. 146–153; and "Composition and Structure of Hevea Latex" by A. R. Kemp, id. pp. 154–158). In producing the purified latex of the present invention, a large proportion of the 50% or more of the solids separated in serum portions are rubber particles of small diameter so that the proportion of the larger rubber particles in the final purified latex of the present invention, is much greater than in normal latex and in the conventional purified latices where more than 50% of the solids of the original latex are recovered in the final cream. I have found that the minimum average particle diameter of the purified latex of the present invention is 1.0 micron. It is the retention of a large proportion of rubber particles of large diameter in the cream portions and the separation of a large proportion of the smaller rubber particles in the serum portions that increases the average particle size of the final purified latex to 1.0 micron or more.

That the nitrogen content of the purified latex of the present invention is less than that heretofore obtained in multiple creaming and washing operations, is also believed due to the separation of a large proportion of the small rubber particles when at least 50% of the total solids of the latex are removed in the various serum portions according to the present invention. It is the protein that is adsorbed on the rubber particles and that cannot be removed by any amount of washing as in multiple creaming processes, that is responsible for the residual nitrogen content of a purified latex even where substantially all the original serum has been removed. This residual nitrogen content which remains after any amount of washing thus differs from the normally occurring water-soluble ingredients in the latex which can be removed strictly in proportion to the amount of original serum removed in any creaming operation. It is believed that the reduction of the nitrogen in the present invention to .050% or less based on the solids in the purified latex is due to the fact that the smaller rubber particles which are removed in the serum when not more than 50% of the total solids of the original latex are recovered in the final cream, carry a greater percentage by weight of adsorbed protein than do the larger rubber particles, and hence the separation of a large proportion of the smaller rubber particles in the serum in the purifying operation of the present invention reduces the nitrogen content of the recovered cream to below that normally obtained in multiple creaming operations, where maximum recovery of rubber solids is the desideratum. It is thus seen that the preparation of purified rubber latex with a nitrogen content of not more than .050% based on the solids of the latex according to the present invention is dependent on; first, the tendency of larger rubber particles to cream out leaving smaller rubber particles in the serum in creaming operations; second, the washing of the rubber particles in the cream to the extent of removal of at least 98% of the original serum of the latex and the consequent retention in the final purified latex of not more than 2% of the normally occurring water-soluble ingredients of the original latex; and third, the recovery in the final purified latex of not more than 50% of the total solids of the original latex.

In creaming by centrifuging, according to the present invention, it is a simple matter to regulate the feed of the centrifuge bowl in any one or more of the centrifuging operations so that the amount of solids left in the final cream phase will not be more than 50% of the total solids in the original latex. If, for example, in centrifuging a 36% solids latex and diluting successive creams to approximately the same concentration before subsequent centrifuging operations, the feed of the centrifuge bowl is so regulated that a serum of 23% solids or more is obtained in any one centrifuging operation, 50% or more of the total solids of the latex will be separated in that serum. Thus, for the other centrifuging operations, the feed may be regulated so that the maximum recovery of solids in the other creams and the minimum loss of solids in the other serums are obtained. Similarly, in chemical creaming operations, for example, if .10% of an ammonium alginate, based on the liquid content, is known to give 85% to 90% recovery of solids in the cream portion, as is commonly the case in commercial creaming, then it has been found that .02% of that same alignate in any one creaming operation on a 36% solids latex will separate a serum of 23% or more solids corresponding to 50% or more of the total solids of the latex. It may be readily seen that by the present invention there is obtained a new type of purified latex, containing not more than .050% nitrogen based on the solids in the latex and with an average particle diameter of the rubber particles at least 1.0 micron, and substantially free of the alkali-metal hydroxides, whose addition in prior creaming methods was necessary for obtaining the low nitrogen content of the present latex.

Rubber compounds made from latices of the present invention are characterized by extremely low water absorption and excellent electrical properties. For example, a latex cream purified according to the present invention and containing 50% recovery of total solids of the original latex and having a nitrogen content of .049% based on the rubber in the cream was compared with a latex cream prepared from the same original latex but creamed according to present known methods to a 90% recovery of total solids with a washing to the same extent as the cream with 50% recovery of solids. This second cream had a nitrogen content of .10 based on the rubber. A sample of each purified cream was compounded as follows:

| | Parts by weight |
|---|---|
| Rubber in the cream | 100 |
| Sulphur | 2.5 |
| Zinc oxide | 1.6 |
| Accelerator | 2.4 |
| Antioxidant | 1 |

Dried and vulcanized films from the two creams compounded as above were immersed in water at room temperature for 365 days, at which time it was found that the film prepared from the 50% recovery cream absorbed 3.09% water and the film prepared from the 90% recovery cream absorbed 6.97% water. The dielectric constant of the dried and vulcanized film was larger in the case of the film deposited from the 90% recovery cream than in the case of the film deposited from the 50% recovery cream, and on soaking for the 365 days the dielectric constant increased more rapidly in the case of the film deposited from the 90% recovery cream.

In view of the many changes and modifications that may be made without departing from the principles underlying the invention, reference should be made to the appended claims for an understanding of the scope of the invention.

Having thus described my invention, what I claim and desire to protect by Letters Patent is:

1. The process of purifying rubber latex which comprises separating rubber latex into cream and serum portions and washing the rubber particles in the cream a sufficient amount so that not more than 2% of the original serum of the latex remains in the final cream, and recovering in the final cream not more than 50% of the total solids of the original latex, at least 50% of the total solids of the original latex being separated in the serum portion or portions.

2. The process of purifying rubber latex which comprises chemically creaming rubber latex and washing the rubber particles in the cream a sufficient amount so that not more than 2% of the original serum of the latex remains in the final cream, and recovering in the final cream not more than 50% of the total solids of the original latex, at least 50% of the total solids of the original latex being separated in the serum portion or portions.

3. The process of purifying rubber latex which comprises centrifuging rubber latex and washing the rubber particles in the cream a sufficient amount so that not more than 2% of the original serum of the latex remains in the final cream, and recovering in the final cream not more than 50% of the total solids of the original latex, at least 50% of the total solids of the original latex being separated in the serium portion or portions.

4. Purified rubber latex cream having an average particle diameter of at least 1.0 micron and a nitrogen content of not more than .050% based on the solids of the cream, said cream being substantially identical with a product formed by the process of claim 1.

JOHN McGAVACK.